UNITED STATES PATENT OFFICE.

RANSOM R. CHAMPLIN, OF CANDIA, NEW HAMPSHIRE.

CARBON-REMOVER.

1,372,639.  Specification of Letters Patent.  Patented Mar. 22, 1921.

No Drawing.  Application filed July 23, 1919.  Serial No. 312,681.

*To all whom it may concern:*

Be it known that I, RANSOM R. CHAMPLIN, a citizen of the United States, and a resident of Candia, in the county of Rockingham and State of New Hampshire, have invented a new and useful Carbon-Remover, of which the following is a full, clear, and exact description.

This invention relates to an improved composition for removing carbon from internal combustion engines, and has for an object to provide an improved composition which may be cheaply made and which in operation will not injure any of the engine or mechanism with which it comes in contact.

Another object of the invention is to provide an improved composition for removing carbon which may be used in the cylinder or may be used separately, and an article covered with carbon submerged therein without injury to the parts brought in contact with the composition.

In preparing a given quantity the following ingredients and proportions have been found to produce desirable results, though slight changes in the proportions may be made without departing from the spirit of the invention. For a given batch denatured alcohol 4 ounces, benzin 1 ounce, kerosene 1 oz., and water 12 ozs. To these are added ½ ounce of camphor, 1 ounce sodium hydroxid and one ounce sodium carbonate.

In forming a given quantity the above ingredients are all deposited in a container in any desired succession, or all together and then mixed thoroughly, after which the composition is ready for use. During the use of the composition articles may be submerged in the composition, or the composition may be placed on the articles from which the carbon is to be removed. This may be done by pouring same for instance, in a cylinder, spraying the same in a cylinder, or otherwise bringing the composition in contact with the carbon. When an article heavily covered with carbon is placed in the composition, the carbon in the course of a short time, as for instance ten minutes, becomes sufficiently soft to be wiped off by a cloth. This dissolving of the carbon will not in any way injure the article, even if the article was left in the composition for a long time. The coal oil or kerosene will act to prevent any of the chemicals injuring the metal parts, though it will combine either completely or to a certain extent with the benzin for softening the carbon. The other chemicals, aside from the coal oil and benzin, will also act to soften the carbon, except the water, but are retarded to a certain extent by being diluted, whereby the protecting element, namely the coal oil, is able to prevent injury to the metal parts while the carbon itself is readily attacked. In use, after the composition has been used not only is the carbon removed by wiping, or in some other manner, but the composition is also removed at the same time and leaves the parts in a perfectly clean condition. Where the composition is sprayed into the engine cylinder it may be removed in any desired manner, as for instance by turning over the engine and blowing the softened carbon through the opening normally occupied by the spark plug, or the engine may be turned over and allowed to run under its own power and the carbon forced out through the exhaust.

What I claim is:

A composition for removing carbon from metal comprising in proportion denatured alcohol 4 ounces, benzin one ounce, kerosene one oz., water 12 ounces, to which is added camphor ½ ounce, sodium hydroxid one ounce and sodium carbonate one ounce.

RANSOM R. CHAMPLIN.